US 8,248,390 B2

(12) United States Patent
Sheynkman et al.

(10) Patent No.: US 8,248,390 B2
(45) Date of Patent: Aug. 21, 2012

(54) ELECTRONIC DEVICE

(75) Inventors: Igor Sheynkman, Bney Aish (IL);
Michael Astanovsky, Hadera (IL)

(73) Assignee: Motorola Solutions, Inc., Schaumburg, IL (US)

( * ) Notice: Subject to any disclaimer, the term of this patent is extended or adjusted under 35 U.S.C. 154(b) by 830 days.

(21) Appl. No.: 12/281,189

(22) PCT Filed: Mar. 2, 2007

(86) PCT No.: PCT/US2007/063141
§ 371 (c)(1),
(2), (4) Date: Oct. 31, 2008

(87) PCT Pub. No.: WO2007/103774
PCT Pub. Date: Sep. 13, 2007

(65) Prior Publication Data
US 2009/0128523 A1   May 21, 2009

(30) Foreign Application Priority Data
Mar. 3, 2006 (GB) .................................. 0604287.3

(51) Int. Cl.
*G06F 3/033* (2006.01)
*G06F 3/041* (2006.01)

(52) U.S. Cl. ...................... 345/179; 345/173; 178/18.01; 178/19.01

(58) Field of Classification Search .................. None
See application file for complete search history.

(56) References Cited

U.S. PATENT DOCUMENTS

| 4,922,236 | A | * | 5/1990 | Heady | 345/166 |
| 4,927,986 | A | * | 5/1990 | Daly | 178/19.01 |
| 5,756,941 | A | * | 5/1998 | Snell | 178/19.01 |
| 2002/0140714 | A1 | | 10/2002 | Hoffman | |
| 2003/0067453 | A1 | | 4/2003 | Liu | |
| 2005/0110765 | A1 | | 5/2005 | Baeza | |
| 2005/0174727 | A1 | | 8/2005 | Thomas | |

(Continued)

FOREIGN PATENT DOCUMENTS
EP    1602509 A2    12/2005

OTHER PUBLICATIONS

International Search Report and Written Opinion for International Application No. PCT/US2007/063141 mailed on Feb. 12, 2008.

(Continued)

*Primary Examiner* — Andrew L Sniezek
(74) *Attorney, Agent, or Firm* — Anthony P. Curtis; Daniel R. Bestor

(57) ABSTRACT

An electronic device (200) comprises a touch screen (210), a pen-form stylus (170) for activating the touch screen (210), and a receptacle (220) located within or coupled to the electronic device (200) for storage of the pen-form stylus (170). The electronic device (200) comprises a flexible attachment mechanism (130) that is fixed to both the pen-form stylus (120) and the electronic device (230). The stylus (170) comprises a slot (150) such that the flexible attachment mechanism (130) is located within the slot (150). In this manner, an efficient geometry of the electronic device prevents the stylus being misplaced and enables the flexible attachment mechanism (130) to be located within the slot by the action of inserting the stylus (170) into the receptacle (220).

17 Claims, 4 Drawing Sheets

U.S. PATENT DOCUMENTS

2009/0128521 A1* 5/2009 Chen .............................. 345/179

OTHER PUBLICATIONS

International Preliminary Report on Patentability for International Application No. PCT/US2007/063141 mailed on Sep. 18, 2008.

Office Action mailed on Apr. 2, 2008 in Great Britain Patent Application No. GB0604287.3.
English language translation of Office Action mailed on Feb. 5, 2010 in Chinese Patent Application No. 200780007689.9.
Search Report mailed on Jun. 14, 2006 in Great Britain Patent Application No. GB0604287.3.

* cited by examiner

ELECTRONIC DEVICE

FIELD OF THE INVENTION

Embodiments of the present invention relate to an electronic device comprising a touch-screen and associated stylus, and more particularly to a secure tethering and storage mechanism therefor. The invention is applicable, but not limited to, mobile telephones, personal digital assistants (PDAs), industrial computers and mobile computers.

BACKGROUND OF THE INVENTION

Touch screen devices are operated by physically touching the screen of the device, either with a finger or a suitable mechanical device such as a pen or stylus. In the case of smaller touch-screen devices such as PDAs, a suitable stylus is normally provided with the device. The stylus, when not in use, is usually stored in a pocket or slot in, or on, the device itself.

A problem with such arrangements is that once the stylus is removed from its pocket or slot, it becomes very easy to lose. The stylus may also simply fall out of its pocket whilst the device is being carried, and be lost.

It is possible to mechanically fix the stylus to the device by means of a flexible attachment or tethering cord, such as a piece of string, thin rope, or flexible plastic.

One problem with such a mechanical fixing arrangement is that the flexible attachment must be long enough, to provide the user with sufficient freedom to "write" on all parts of the screen with the stylus. This means, that when the stylus is in its pocket or slot the long flexible attachment is unrestrained, and becomes very obtrusive.

It is possible to make the flexible attachment short, in order to avoid this problem, thereby limiting its range of movement. However, this makes using the stylus very difficult and frustrating for the user.

Other concepts utilising sprung mechanical mechanisms or retractable tethering cords are complex, prone to failure and expensive. Furthermore, such sprung mechanical mechanisms influence the continued use of the stylus, in that they tend to pull the stylus in the direction of the pocket and therefore require an increased 'loose' space inside the device to receive the sprung mechanism.

Thus, there is a need for an improved, low-cost, robust stylus tethering arrangement for touch screen devices, which aims to alleviate the problems associated with existing arrangements.

BRIEF DESCRIPTION OF THE DRAWINGS

The accompanying FIG's, where like reference numerals refer to identical or functionally similar elements throughout the separate views and which together with the detailed description below are incorporated in and form part of the specification, serve to further illustrate various embodiments and to explain various principles and advantages all in accordance with the present invention, in which.

DESCRIPTION OF EMBODIMENTS OF THE INVENTION

Figure 1:
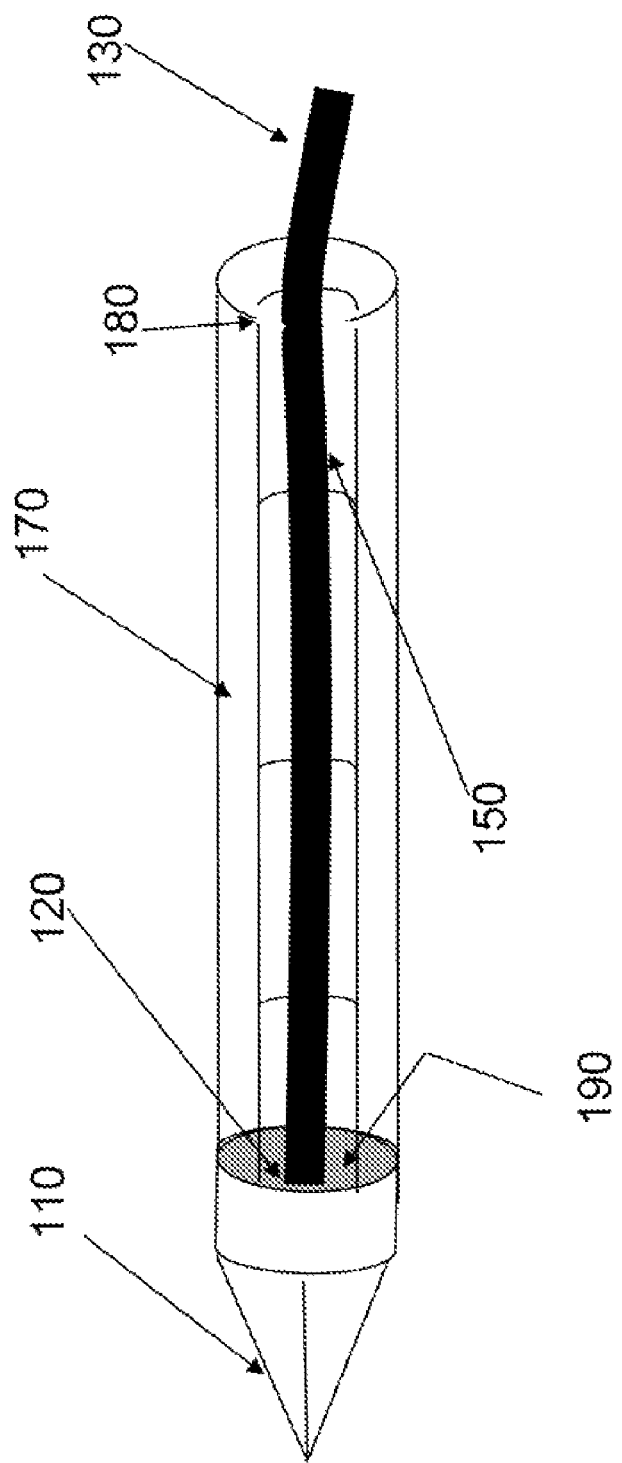
FIG. 1 illustrates a stylus adapted in accordance with an embodiment of the present invention.

One embodiment of the present invention describes an electronic device comprising a touch screen, a pen-form stylus for activating the touch screen and a receptacle located within or coupled to the electronic device for storage of the pen-form stylus. A flexible attachment mechanism is fixed to both the pen-form stylus and the electronic device. The stylus may comprise a slot such that the flexible attachment mechanism is located within the slot.

In this manner, an efficient geometry of the electronic device may prevent the stylus being misplaced and may enable the flexible attachment mechanism to be located within the slot by the action of inserting the stylus into the receptacle.

In one embodiment of the present invention, the flexible attachment mechanism may be located to one end of the stylus at a fixing point and the slot runs from the fixing point along a length of the stylus to a distal end from the fixing point.

In this manner, the flexible attachment mechanism may be extended, by removal from the slot to provide easier use for a user in applying the stylus to the touch screen.

In one embodiment of the present invention, the fixing point is located within the slot, thereby facilitating a secure fixing of the flexible attachment mechanism, such as a rope, fibre or thin plastic/metal material, etc.

In one embodiment of the present invention, a dimension of the slot is such that the flexible attachment mechanism lies within a volume of the slot along the full length of said slot. In this manner, the slot may substantially store away the flexible attachment mechanism when the stylus is not in use.

In one embodiment of the present invention, a dimension of the receptacle is such that the stylus may be located completely within the receptacle.

In this manner, the stylus may be arranged to protrude or not to protrude from the electronic device, such that a simple tugging operation on the flexible attachment mechanism may remove the stylus from the receptacle. Similarly, insertion of the stylus into the receptacle may cause the flexible attachment mechanism to lie within the slot provided within a body of the stylus.

In one embodiment of the present invention, the fixing point of the flexible attachment mechanism may be located adjacent a tapered end of the stylus, such that a longer length of flexible attachment mechanism may be used, thereby providing easier use of the stylus.

In one embodiment of the present invention, the flexible attachment mechanism may be located on an inner surface created by the end of the slot, this surface being perpendicular to the slot. In this manner, the slot may be advantageously manufactured to provide the fixing mechanism as well as support for the stylus.

In one embodiment of the present invention, the slot may run spirally away from the fixing point along a length of the stylus, thereby providing an increased length of the flexible attachment mechanism.

One embodiment of the present invention provides a pen-form stylus for activating a touch screen of an electronic device. The stylus may be provided with a slot comprising a flexible attachment mechanism. The slot may run from a point near a tapered end of the stylus along a length of the stylus.

In one embodiment of the present invention the stylus may be constructed from two parts, a first part (330) having a recess at a tapered end of the slot with a second part having a corresponding, co-operating extended form for insertion into the recess.

One embodiment of the present invention will be described in terms of a stylus of touch-screen Personal Digital Assistant (PDA). However, it will be appreciated that the inventive concept may be embodied in any touch-screen based electronic device requiring or using a stylus that could benefit from the invention herein described.

Referring now to FIG. 1, wherein a stylus 170 according to embodiments of the present invention is illustrated. The stylus 170 has a pen-shaped body, including a tapered end 110 for accurately interacting with the touch screen of a PDA. The stylus 170 is furthermore advantageously provided with a slot 150, the slot 150 being sufficiently wide and deep to accommodate a tethering cord 130. The slot 150 extends from a cord fixing point 120, along the full length of the stylus 170 to its end 180.

Importantly, and advantageously, the slot 150 continues through the end 180 of the stylus 170, allowing the cord 130, which is shown lying within the slot 150, to follow the profile of the stylus 150 along its full length. The cord 130 may be made of any suitably flexible, light and robust material, such as some form of plastic, metalised-plastic, fabric or rope, etc.

Again referring to FIG. 1, it can be seen that the slot 150 is advantageously designed such that the cord 130 can lie completely within its volume. That is, when the cord 130 is lying within the slot 150, the cord 130 and stylus 170 together occupy a volume equal to that defined by the maximum external dimensions of the stylus 170 alone. This advantageous construction allows a tethering cord 130 to be elegantly integrated with a stylus 170.

Figure 2:
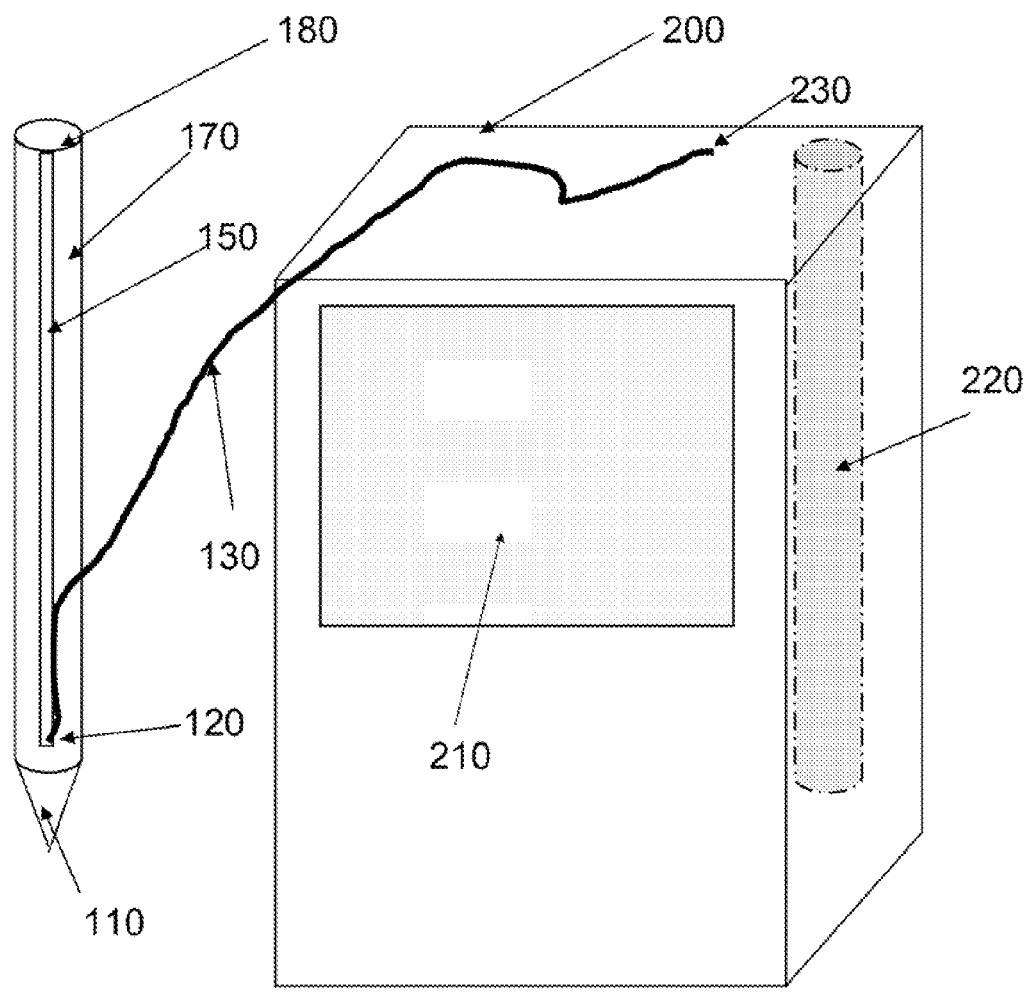
FIG. 2 illustrates an electronic touch-screen device with tethered stylus according to embodiments of the present invention.

Referring now to FIG. 2, illustrated therein is a PDA 200 having a touch screen 210, a stylus 170, and a cord 130 for securing the stylus 170 to the PDA 200. The cord 130 is fixed to both the stylus 170 and the device 200 respectively at the points shown 120, 230. The PDA 200 also comprises, advantageously, a stylus-shaped receptacle 220 for storing the stylus 170 when it is not in use.

The advantageous construction of the stylus 170, according to embodiments of the current invention, means that the cylindrical receptacle 220 need only be slightly larger than the stylus 170, in order to fully accommodate it and the tethering cord for storage, and prevent friction with either the stylus 170 or the cord 130. This is possible because the cord 130, as shown in FIG. 1, lies, advantageously, within the slot 150. Thus, the arrangement does not increase the space required by the tethered stylus in the receptacle 220. The tethering cord 130 may, thus, be advantageously contained within a receptacle 220 having a volume defined by the maximum external dimensions of the stylus 170, and not by the stylus 170 plus the cord 130.

Referring again to FIG. 1, where the cord 130 is shown fixed to the stylus 170, at the end of the slot 150 nearest the taper 110. The cord 130 is advantageously fixed to the stylus 170, such that it is substantially perpendicular to an inner surface 190 of the tapered end of the stylus 170. The inner surface 190 is also substantially perpendicular to the direction of the slot 150.

This advantageous construction ensures that the cord 130 lies parallel to the walls of the slot 150, and thus to the stylus 170, from its fixing point 120 and along its full length.

The advantageous geometry of the fixing point 120 defined by the surface 190 and the cord 130, is such that a kink or loop can not form in the cord 130 at the fixing point 120, when the cord 130 is lying in the slot 150.

Were the cord 130 to be fixed to another surface of the slot 150, a loop may form at the connection point 120 when attempting to lie the cord 130 into the slot 150. Such a loop may cause the cord 130 to extend beyond the volume enclosed by the stylus body 170, thus increasing the required volume of the receptacle 220 used for storage of the stylus 170. This advantageous embodiment of the present invention reduces significantly the mechanical stress on the cord 130 at the fixing point 120, thus increasing its reliability.

The beneficial construction of a stylus 170 according to embodiments of the present invention, thus allows the receptacle 220 to have a maximum width (diameter) only slightly greater than that of the stylus body 170 itself. This is made possible by providing a slot 150 in the stylus 170 within which the cord 130 lies when the stylus is within the receptacle.

When the stylus 170 is not being used, it can be stored in the receptacle 220 as shown in FIG. 2. The user of the device pushes the stylus 170, tapered end 110 first, into the opening 240 for storage, the stylus 170 and cord 130 fitting completely within the receptacle 220.

The stylus 170 is now, advantageously, stored completely within the receptacle, and does not obtrude beyond the housing of the device 200. Thus, the surface of the device is substantially smooth, and does not catch on the user's pocket, or clothing.

Advantageously, when the stylus 170 is required for use by a user, the cord 130 can be used to pull the stylus 170, from the receptacle 220, thus no portion of the stylus need protrude above the surface of the device 200.

Referring again to FIG. 2, it can be seen from the geometry of the stylus 170, the tethering cord 130, and device 200, that locating the fixing point 120 of the cord 130 near to the tapered end 110 of the stylus 170, and allowing the stylus 170 to be inserted into the receptacle 220 tapered-end 110 first, has a further advantageous effect. The length of cord 130 left exposed when the stylus 170 is stored within the receptacle 220 is reduced, as a length of cord 130 almost equal to the length of the stylus is, advantageously, stored within the receptacle 220.

It will be appreciated that a minimum length of cord 130 is required in order to allow all areas of the touch screen 210 to be comfortably reached by the tapered end 110 of the stylus 170. That is, the cord must have sufficient length, such that a user is able to hold the stylus 170 as if it were a pen, and interact with (write on) all areas of the touch screen 210. The length of cord 130 required is advantageously reduced when the cord 130 is attached to the stylus 170 near to its tapered end 110.

This can be seen by examining the geometry of the device 200, and the tethered stylus 170, when the stylus is in use. When the stylus 170 is being used to write on the screen 220, it is held substantially vertically like a pen. In this case, one end of the stylus 180, distal from the tapered end, the tapered end of the stylus 110, and the mounting point 230, form (approximately) a right angle triangle. A line linking the end of the stylus 180 and the fixing point 230 forms the hypotenuse of such a triangular form.

Given that the cord 130 should not unduly interfere with the functioning of the stylus 170, the optimal position for the fixing point 120 is on the body of the stylus 170 near to the tapered end 110, as illustrated in both FIG. 1 and FIG. 2.

Referring again to FIG. 2, it can be seen that the cord 130 is constrained only at its two fixing points 120, 130 and is otherwise free to move. Inserting the stylus 170 into the receptacle 220 causes the cord 130, which is attached to the stylus 170 such that at its fixing point 120 it lies parallel to the stylus body 170, to be forced into the slot 150. The advantageous embodiments of the invention herein described, result in a geometry of the tethering arrangement, such that the cord 130 is easily pressed into the slot by the action of inserting the stylus 170 into the receptacle 220. This, advantageously, prevents the cord from jamming in the limited space between the stylus body 170 and the inside wall of the receptacle 220.

Referring now to FIG. 1, it can be seen that the slot 150 runs substantially linearly along the length of the stylus 170. However, it is envisaged that other forms of slot are possible and beneficial. For example, in a further advantageous embodiment of the invention, the slot 150 forms a spiral running the length of the stylus 170. A spiral-form slot is, advantageously, longer than a linear slot 150. Thus, the length of cord 130 contained within the receptacle 220 when the stylus is stored, is correspondingly increased.

By this means, the total length of the tethering cord 130 can be increased, without increasing the length of cord 130 external to the receptacle, i.e. unconstrained cord, when the stylus is stored. In this embodiment, the geometry of the fixing point 120 may be modified, such that the inner surface 190, to which the fixed cord is perpendicular at the fixing point 120, remains perpendicular to the direction of the spiral-form slot at its end point.

Figure 3:
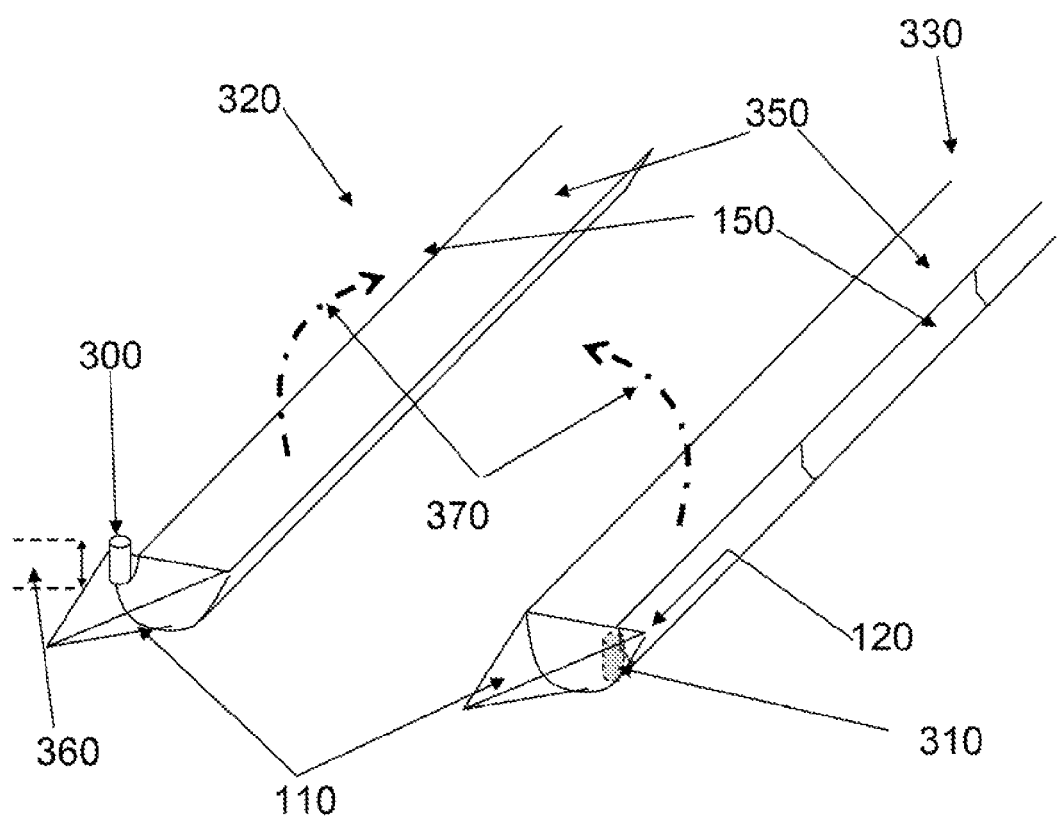
FIG. 3 illustrates a two-part stylus according to embodiments of the present invention.

Referring now to the schematic diagram of FIG. 3, illustrated therein is a schematic view of the two halves 320, 330 of a two-part stylus 170. The two halves 320, 330 are substantially symmetrical around the centre line of the slot 150, each half providing half of the slot and are advantageously produced by a low cost process such as injection moulding.

A first part 330 is advantageously provided with a cylindrically shaped recess 310, at the end of the slot structure 150, close to the tapered end 110 of the part 330. A second part 320 is advantageously provided with a matching cylindrical protrusion 300, which mates with recess 310 when the halves 320, 330 are joined.

The length 360 of the protrusion 300 is somewhat less than the depth of the recess 310, so that the protrusion does not completely fill the recess when the parts 320, 330 are joined. The recess 310 is positioned at the tapered end 110 of the first part 330, at the end of the slot structure 150, such that the end of an attachment cord 130 placed into the slot structure 150, can easily be inserted into it.

Once the end of the cord 130 is inserted into the recess 310, the two halves 320, 330, may be assembled to each other. This may be performed by rotating 370 the two parts 320, 330 such that the surfaces 340, 350 are pressed together. The protrusion 300 now mates with the recess 310, fixing the end of the cord 130 firmly in place 420 within the recess 310.

The parts 320, 330 may then be glued or otherwise held permanently together to form a stylus 170 with a fixed attachment cord 130. The cord 130 is fixed to the stylus 170 such that it protrudes through the inner surface (190 of FIG. 1) created by the end of the slot 150, in a manner in accordance with the described embodiments of the invention.

Figure 4:
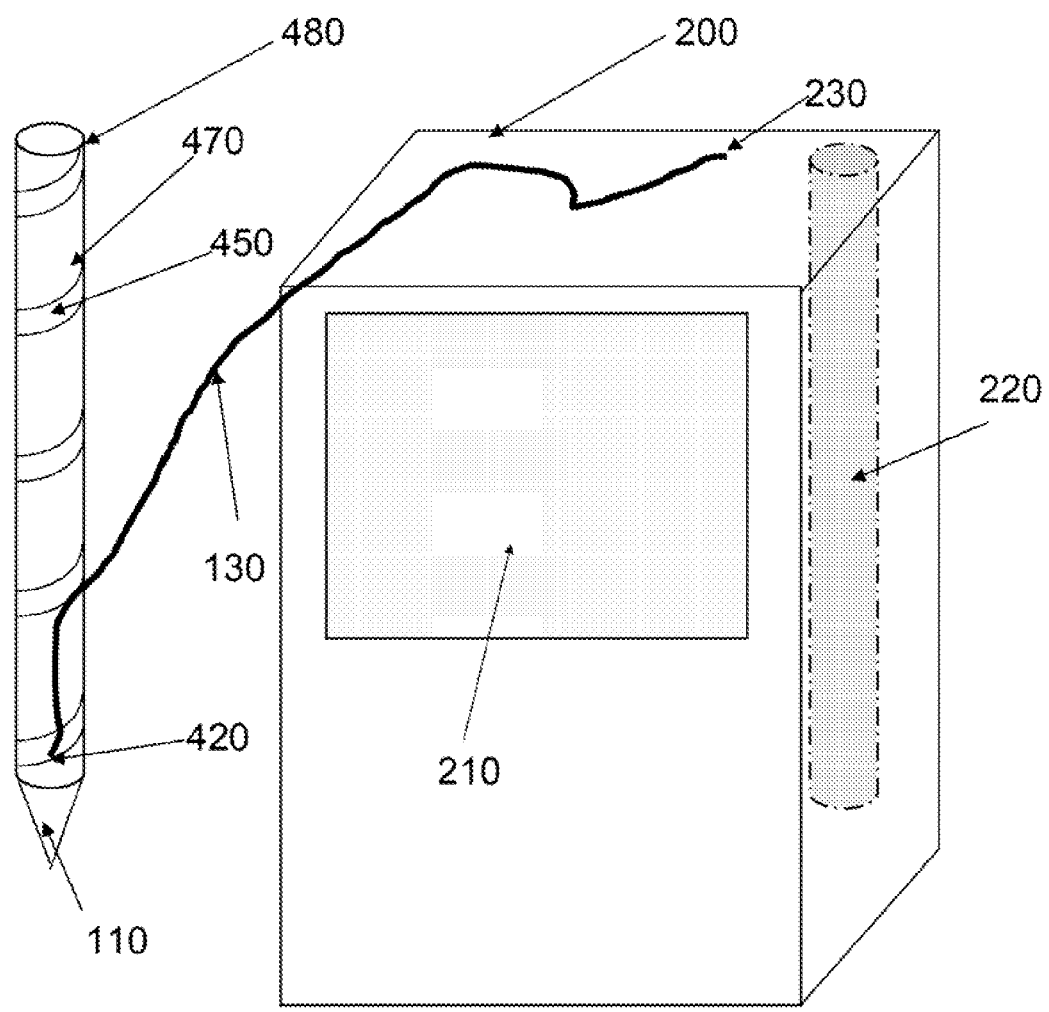
FIG. 4 illustrates the electronic touch-screen device with tethered stylus according to FIG. 2 having a spirally running slot in accordance with embodiments of the present invention.

Referring now to FIG. 4, which is a modified version of FIG. 2, and retains all of the reference characters from FIG. 2 that are unchanged, wherein a stylus 470 according to embodiments of the present invention is illustrated. The stylus 470 has a pen-shaped body, including a tapered end 110 for accurately interacting with the touch screen of a PDA. The stylus 470 is furthermore advantageously provided with a spiral slot 450, the slot 450 being sufficiently wide and deep to accommodate the tethering cord 130. The slot 150 extends from a cord fixing point 420, along the full length of the stylus 470 to its end 480. As set forth earlier, the spiral slot 450 is, advantageously, longer than the linear slot 150. Thus, the length of cord 130 contained within the receptacle 220 when the stylus is stored, is correspondingly increased.

Although the present invention has been described in connection with some embodiments, it is not intended to be limited to the specific form set forth herein. Additionally, although a feature may appear to be described in connection with particular embodiments, one skilled in the art would recognize that various features of the described embodiments may be combined in accordance with the invention.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

In this manner, the aforementioned problems associated with stylus tethering arrangements have been substantially resolved, whilst simultaneously alleviating the problems associated with the prior-art.

The invention claimed is:

1. An electronic device comprising:
a touch screen,
a pen-form stylus for activating the touch screen comprising a substantially tapered portion and a substantially non-tapered portion; and
a receptacle located within or coupled to the electronic device for storage of the pen-form stylus,
wherein a flexible attachment mechanism is fixed to both the pen-form stylus and the electronic device, and the stylus comprises a slot extending substantially an entire length of the non-tapered portion such that, when stored in the receptacle, the flexible attachment mechanism is locatable within the slot and such that, when removed from the receptacle, the flexible attachment mechanism is movable out of the slot; and
wherein the flexible attachment mechanism comprises a tethering cord having one end attached to the stylus at the tapered portion of the stylus and within the slot and another end adapted to be fitted to an electronic device.

2. The electronic device of claim 1, wherein the flexible attachment mechanism is located to one end of the stylus at a fixing point and the slot runs from said fixing point along a length of the stylus to a distal end from said fixing point.

3. The electronic device of claim 2, wherein said fixing point is located within the slot.

4. The electronic device of claim 2, wherein a dimension of the slot is such that the flexible attachment mechanism lies within a volume of the slot along the full length of said slot.

5. The electronic device of claim 1, wherein a dimension of the receptacle is such that the stylus may be located completely within the receptacle.

6. The electronic device of claim 1, wherein the flexible attachment mechanism is fixed to the stylus at a fixing point located immediately adjacent a tapered end of the stylus.

7. The electronic device of claim 6, wherein the flexible attachment mechanism is located on an inner surface created by the end of the slot, this surface being perpendicular to the slot.

8. The electronic device of claim 1, wherein insertion of the stylus into the receptacle causes the flexible attachment mechanism to lie within the slot provided within a body of the stylus.

9. The electronic device of claim 1, wherein the slot runs spirally along a length of the stylus.

10. The electronic device of claim 1, further wherein the stylus is constructed from two parts, a first part having a recess at the tapered end of the stylus, and a second part having a corresponding, co-operating extended form at the tapered end of the stylus for insertion into the recess.

11. The electronic device of claim 1, wherein, while in use, the flexible attachment mechanism exits the slot at an end of the slot closest to the tapered portion of the stylus.

12. A pen-form stylus for activating a touch screen of an electronic device the stylus comprising:
   a substantially tapered portion and a substantially non-tapered portion;
   a slot running from a point near a tapered end of the stylus and along substantially an entire length of the non-tapered portion of the stylus; and
   a flexible attachment mechanism comprising a tethering cord having one end attached to the stylus at the tapered portion of the stylus and within the slot and another end adapted to be fitted to an electronic device so that (i) when the cord is fitted to the electronic device the attached stylus is suitable for activating a touch screen of the electronic device (ii) when stored the flexible attachment mechanism is locatable within the slot and (iii) when un-stored the flexible attachment mechanism is movable out of the slot.

13. The pen-form stylus of claim 12, further wherein the stylus is constructed from two parts, a first part having a recess at the tapered end of the stylus, and a second part having a corresponding, co-operating extended form at the tapered end of the stylus for insertion into the recess.

14. The pen-form stylus of claim 12, wherein the slot runs spirally along a length of the stylus.

15. The pen-form stylus of claim 12, wherein, while in use, the flexible attachment mechanism exits the slot at an end of the slot closest to the tapered portion of the stylus.

16. An electronic device comprising:
   a touch interface,
   a pen-form stylus for activating the touch interface comprising a tapered portion at one end for interfacing with the touch interface; and
   a receptacle located within or coupled to the electronic device for storage of the pen-form stylus,
   wherein a flexible attachment mechanism is fixed to both the pen-form stylus and the electronic device, and the stylus comprises a slot extending along a length of the stylus such that, when stored in the receptacle, the flexible attachment mechanism is locatable within the slot and such that, when removed from the receptacle, the flexible attachment mechanism exits the slot at an end of the slot closest to the tapered portion of the stylus; and
   wherein the flexible attachment mechanism is fixed to the pen-form stylus at the tapered portion of the stylus and within the slot.

17. The electronic device of claim 16, wherein the slot runs spirally along a length of the stylus.

\* \* \* \* \*